United States Patent
Shimomura

(10) Patent No.: US 6,536,312 B1
(45) Date of Patent: Mar. 25, 2003

(54) COMPOUND MACHINING CENTER COMPOUND MACHINING METHOD AND MACHINING TOOL

(75) Inventor: Masumi Shimomura, Komatsu (JP)

(73) Assignee: Komatsu Machinery Corporation, Komatsu (JP)

( * ) Notice: Subject to any disclaimer, the term of this patent is extended or adjusted under 35 U.S.C. 154(b) by 0 days.

(21) Appl. No.: 09/567,343

(22) Filed: May 9, 2000

(30) Foreign Application Priority Data

May 13, 1999 (JP) ............................................. 11-132207
May 14, 1999 (JP) ............................................. 11-133509

(51) Int. Cl.[7] .............................. B23B 1/00; B23B 5/18
(52) U.S. Cl. ............................. 82/1.11; 82/106; 409/243
(58) Field of Search .................... 82/1.11, 106; 407/13, 407/14, 15, 18, 19; 409/243, 244, 247, 279, 281

(56) References Cited

U.S. PATENT DOCUMENTS

| | | | |
|---|---|---|---|
| 4,784,534 A | * | 11/1988 | Kaminski et al. ............. 407/19 |
| 4,799,839 A | * | 1/1989 | Berstein et al. ............. 409/244 |
| 4,841,820 A | * | 6/1989 | Kaminski et al. ............. 82/1.11 |
| 5,373,631 A | * | 12/1994 | Schmid .................... 29/888.08 |

FOREIGN PATENT DOCUMENTS

| | | |
|---|---|---|
| JP | 61-3604 | 2/1986 |
| JP | 63-196315 | 8/1988 |
| JP | 63-196316 | 8/1988 |
| JP | 63-237810 | 10/1988 |
| JP | 3-251301 | * 11/1991 |

* cited by examiner

Primary Examiner—Henry Tsai
(74) Attorney, Agent, or Firm—Frishauf, Holtz, Goodman & Chick, P.C.

(57) ABSTRACT

A compound machining center is provided which includes at least one work driving unit, including a chuck, mounted on a bed and adapted to rotate a work to be worked in a state in which the chuck grasps a first end of the work. At least one tail stock center is mounted on the bed and adapted to support a second end of the work so as to support the work on a working axial line between the tail stock center and the chuck of the work driving unit. At least one working unit is disposed on the bed to be movable in an X-axis direction parallel to the working axis line and a Y-axis direction normal to the X-axis direction. And at least one tool is mountable to the working unit to be linearly movable in a tangential direction of the work.

17 Claims, 11 Drawing Sheets

COMPOUND MACHINING CENTER COMPOUND MACHINING METHOD AND MACHINING TOOL

BACKGROUND OF THE INVENTION

1. Technical Field

The present invention relates to a compound machining center capable, of carrying out a compound machining including turn broaching working and turning working, and also relates to a compound machining method and a machine tool. And the present invention further relates to a compound machining center capable of working both ends of a work having a shaft shape by one working machine.

2. Prior Art

In a known art, many kinds of shaft-shaped works (called merely work or works herein) are subjected to turning (roughing) working by using a turning machine such as lathe, and in the prior art, in order to carry out a finishing working continuously after the roughing working, there is known a turret lathe to which a plurality of tools are mounted and by which a work is worked while sequentially changing (exchanging) the tools.

Furthermore, there is known a turn broaching machine as a machine or tool for continuously working the work from the roughing to the finishing.

Such known broaching machine comprises a broaching tool having a disc shape or linear shape and a plurality of (working) tips which are adapted to work the work from the roughing working to the finishing working and which are mounted and arranged to the disc-shaped broaching tool in the circumferential direction thereof or to the linear-shaped broaching tool in the linear direction thereof with a space from each other. The broaching tool is rotated or linearly moved in the tangential direction, while rotating the work, to thereby carry out the turning working and the turn broaching working by means of tips.

However, in the conventional turret lathe, it is required for the turret to have a large size for mounting a plurality of tools, which requires much installation space and, hence, the machine itself is made large and expensive, thus being inconvenient and disadvantageous.

Furthermore, in the conventional broaching machine, since it is necessary to use the large disc-shaped or linear-shaped broaching tool provided with a plurality of tips, as like as the turret lathe mentioned above, a large sized and expensive broaching machine is required. Moreover, since the broaching tool is itself large and heavy, much time and labor are required for an operator to exchange the tools, and in such tool exchanging time, the operation or working of the machine is interrupted, thus being also inconvenient and disadvantageous in productivity, for example.

Incidentally, for example, Japanese Patent Laid-open Pub. Nos. S 63-196315, 63-196316 and S 63-237810 disclose a turning machine for carrying out a turning working to a work while linearly moving a tool.

However, according to the known structures of such publications, the tool is moved linearly only in a direction normal to the axis of the work having shaft shape to carry out the broaching working to the work, and hence, it is impossible to lathe the work while moving the tool in the longitudinal direction of the shaft-shaped work. Therefore, types or kinds of the works to be worked by such turning machine are limited, thus being inconvenient and not practical in use.

Still furthermore, in the prior art, when a shaft-shaped work such as crankshaft is worked by a turning machine such as lathe, there has generally been adopted a method of lathing the work by supporting one end portion of the work by a tail stock center and clamping the other one end portion by a chuck through which the work is rotated.

However, in this known method, the end portion clamped by the chuck cannot be worked. In order to obviate this defect, in the prior art, two turning machines are preliminarily prepared. The entire portion of the work except for the end portion clamped by the chuck is worked by one turning machine and, then, the work is transferred to the other turning machine by which the unworked end portion, which has been clamped by the chuck, is worked.

In a general turning machine, however, the chuck and driving means are disposed on a left side and the tail stock is installed on a right side. Therefore, when both the end portions of the work is worked by using two turning machines, it is necessary to turn, by 180°, the work one end portion of which has been worked by the first turning machine and to mount the work to the second turning machine. For such operation, there is required, a work inverting mechanism provided for the conveying means such as autoloader for conveying the work between the turning machines. Thus, the work conveying means is made complicated in its structure and is made expensive.

Still furthermore, the location of two turning machines at the working line will involve an increased equipment cost and require much space for installation, thus being inconvenient and defective.

To eliminate this defect, Japanese Patent Pub. No. S 61-3604 shows a crankshaft turning machine.

In this crankshaft turning machine, both the end portions of the crankshaft are supported by tail stocks and the intermediate portion thereof is grasped by a grasping member, and the work turning working is carried out by a work driving device while rotating the work.

By the crankshaft turning machine disclosed in the above prior art publication, however, both the end portions of the work can be worked, but the intermediate portion thereof grasped by the grasping member cannot be worked and this intermediate portion should be worked thereafter by another turning machine, which hence requires a plurality of turning machines, involving the increased equipment cost.

Furthermore, a work such as crankshaft has usually both end portions having different shapes, so that the turning (working) conditions are different. Accordingly, when the work is worked by the turning machine mentioned above, since the work is rotated by the single work driving device, it is difficult to turn and cut both the end portions at suitable turning speeds at the times of turning the work with the different working conditions, respectively and hence, it is difficult to carry out the working at a precise performance.

SUMMARY OF THE INVENTION

An object of the present invention is to substantially eliminate defects or drawbacks encountered in the prior art mentioned above and to provide a compound machining center in which a turn broaching working for working a work (workpiece) is performed by linearly moving a tool in a tangential direction of the work while rotating the work and a turning working for turning the work is performed by moving the tool in the direction normal to the axis of the work while rotating the work, independently or in combination, and also provide a compound machining method and a machining tool for the machining center.

Another object of the present invention is to provide the compound machining center, the machining method and the machining tool for improving productivity of works each having a shaft-like long scale by using one turning machine by which the turning working of both end portions of the work can be effectively performed.

These and other objects can be achieved according to the present invention by providing, in one aspect, a compound machining center comprising:

- a work driving unit, including a chuck, mounted on a bed and adapted to rotate a work to be worked in a state of the chuck grasping one end of the work;
- a tail stock center mounted on the bed and adapted to support the other one end of the work so as to support the work on a working axial line between the tail stock center and the chuck of the work driving unit;
- a working unit disposed on the bed to be movable in an X-axis direction parallel to the working axis line and a Y-axis direction normal to the X-axis direction by X-axis driving means and Y-axis driving means; and
- a tool mounted to the working unit to be linearly movable in a tangential direction of the work by Z-axis driving means to thereby carry out turning working and turn broaching working.

In another aspect, there is also provided a compound machining center comprising:

- a pair of work driving units, each including a chuck, mounted on a bed and adapted to rotate a work to be worked in a state of the chucks grasping both ends of the work so as to support the work on a working axis line;
- a pair of working units disposed on the bed to be movable in an X-axis direction parallel to the working axis line and a Y-axis direction normal to the X-axis direction by X-axis driving means and Y-axis driving means; and
- tools mounted to the working units to be linearly movable in a tangential direction of the work by Z-axis driving means to thereby carry out turning working and turn broaching working.

According to the above one and another aspects, the tools can be made compact in comparison of the use of conventional turret lathe, turn broaching apparatus or like, and the machining center is hence itself made compact, reducing manufacturing cost or equipment cost, and the tools can be exchanged with in a short time, improving the productivity.

Furthermore, since a plurality of tips are arranged linearly, an interval between adjacent tips can be made small, reducing a tip indexing time and improving the productivity. Moreover, in a case where the tips are exchanged with the tools being mounted to the machining body at a time when the tips are worn or damaged, the tips can be exchanged with in a short time because of a small interval therebetween.

In preferred embodiments of the above aspects, the tool is linearly moved by the Z-axis driving means in a vertical direction in a state that the working unit is placed on the bed, or the tool is linearly moved by the Z-axis driving means in an obliquely vertical direction in a state that the working unit is placed on the bed.

According to this arrangement, since the linear movement of the tool in the Z-axis direction can be made smooth and accurately, the working precision can be improved.

In a further aspect of the present invention, there is provided a tool for carrying out turning working and turn broaching working to a work to be worked, mounted, to be linearly movable in a tangential direction of the work, to a working unit which is movable in at least one of X-axis direction and Y-axis direction normal to the X-axis direction, the tool comprising:

- a tool body;
- a turning working tip mounted to the tool body for carrying out turning working to the work while moving the tool in at least one of the X-axis direction and Y-axis direction normal to the X-axis direction without linearly moving the tool in the tangential direction of the work; and
- a turn broaching working tip mounted to the tool body for carrying out turn broaching working to the work while linearly moving the tool in the tangential direction of the work.

The turning working tip and the turn broaching working tip are arranged linearly on the tool body.

According to this further aspect, the turning working is carried out by the turning working tip mounted to the tool body while rotating the work and moving the work driving unit in at least one of the X-axis direction and Y-axis direction normal to the X-axis direction, and the turn broaching working is carried out by the turn broaching working tip while linearly moving the tool in the tangential direction of the work, so that the turning working and the turn broaching working can be performed by one machining center. Thus, the machining center can be made compact and can be widely and generally utilized.

In a still further aspect of the present invention, there is provided a compound machining method comprising:

- a step of preparing a tool provided with a plurality of turning working tips and at least one turn broaching working tip, which are arranged linearly to the tool;
- a turning working step in which the tool is linearly moved in a tangential direction of a work to be worked, to position the turning working tips of the tool to a working position, and the work is subjected to the turning working by the turning working tips while rotating the work and moving the tool in at least one of X-axis direction and Y-axis direction normal to the X-axis direction; and
- a turn broaching working step in which the tool is indexed to a broaching working position in an axial direction of the work and the work is then subjected to the turn broaching working by the turn broaching working tip of the tool while rotating the work and linearly moving the tool in the tangential direction of the work,
- wherein the turning working step and the turn broaching working step are carried out independently or in combination thereof to thereby carry out a compound machining working to the work.

According to the above embodiment, since both the turning working and turn broaching working to the work can be carried out by the single (one) machining center, it is not necessary to independently arrange the turning machine and the broaching machine or like, so that the construction cost or equipment cost can be significantly reduced. Moreover, since the turning working and the turn broaching working can be continuously carried out, the productivity can be improved.

In a still further aspect of the present invention, there is provided a compound machining center comprising:

- a pair of work driving units, each including a chuck, mounted to a common bed in a state that both the chucks are opposed to each other, each of the chucks grasping one end of each of works to be worked for rotating the works;

a pair of tail stock centers, each including a center member, disposed between the work driving units in a state that the center members are opposed to the chucks respectively, each of the center members supporting other end of each of the works, the tail stock centers and the work driving units constituting a first work station and a second work station so as to support both the works on same working axis line;

a plurality of working units mounted on the common bed to be movable in an X-axis direction parallel to the working axis line and a Y-axis direction normal to the X-axis direction; and a plurality of tools detachably mounted to the working units respectively for working the works.

In a still further aspect of the present invention, there is also provided a compound machining center comprising:

a pair of tail stock centers, each including a center member, mounted to a common bed in a state that both the centers are opposed to each other, each of the center members supporting one end of each of works to be worked;

a pair of work driving units, each including a chuck, disposed between said tail stock centers in a state that the chucks are opposed to the center members respectively, each of the chucks grasping other one end of each of the works, the work driving units and the tail a stock centers constituting a first work station and a second work station for rotating and driving both the works on same working axis line;

a plurality of working units mounted on the common bed to be movable in an X-axis direction parallel to the working axis line and a Y-axis direction normal to the X-axis direction; and a plurality of tools detachably mounted to the working units respectively for working the works.

According to the above still further aspects, both the end portions of the long-scaled work such as crankshaft can be worked by the single turning machine, and hence, it is not necessary to arrange two turning machines on the working line, thus largely reducing the equipment cost or like, and the machine can be installed in a small space.

Furthermore, since the work driving units provided with the chucks, each for grasping one end of the work, disposed on both end sides of the bed, the work which has been worked in the first work station can be conveyed to the second work station without rotating the work by 180° to carry out the further working. Thus, no inverting motion is required to convey the work to the second work station from the first work station, so that the work conveyance can be smoothly performed between the respective work stations.

Still furthermore, according to these aspects, since the work driving units are mounted independently to the first and second work stations, both the end portions of the work such as crankshaft having different forms so as to be worked on the different conditions, can be worked at the same time on the different working (cutting) conditions at the first and second work stations. Accordingly, the working time can be significantly shortened in comparison with the conventional working process in which the work end portions are worked separately, thus improving the productivity.

In preferred embodiments of the above aspects, the tools are mounted to the working units to be movable linearly in a vertical (Z-axis) direction in a state mounted on the common bed, and each of the tools comprising: a tool body; a turning working tip mounted to the tool body for carrying out turning working to the work while moving the tool in at least one of the X-axis direction and Y-axis direction without linearly moving the tool in the Z-axis direction; and a turn broaching working tip mounted to the tool body for carrying out turn broaching working to the work while linearly moving the tool in the Z-axis direction.

The tools may be mounted to the working units to be movable linearly in an obliquely vertical direction in a state mounted on the common bed, and each of the tools comprising: a tool body; a turning working tip mounted to the tool body for carrying out turning working to the work while moving the tool in at least one of the X-axis direction and Y-axis direction without linearly moving the tool in the obliquely vertical direction; and a turn broaching working tip mounted to the tool body for carrying out turn broaching working to the work while linearly moving the tool in the obliquely vertical direction.

According to such preferred embodiments, the turning working is carried out by the turning working tip mounted to the tool body while rotating the work and moving the working units in at least one of the X-axis direction and Y-axis direction normal to the X-axis direction, and the turn broaching working is carried out by the turn broaching working tip while linearly moving the tool in the tangential direction of the work, so that the turning working and the turn broaching working can be performed by one machining center. Thus, the machining center can be made compact, and can be widely and generally utilized.

In a further preferred embodiment, the tools are circular broaching tools mounted to the working units to be rotatable, each of the tools comprising: a tool body; a turn broaching working tip mounted to the tool body for carrying out turn broaching working to the work while rotating the circular broaching tool; and a turning working tip for carrying out turning working to the work while moving the working units in at least one of the X-axis direction and Y-axis direction without rotating the circular broaching tool.

According to this preferred embodiment, the turning working is carried out by the turning working tip mounted to the tool body while rotating the work and moving the working units in at least one of the X-axis direction and Y-axis direction normal to the X-axis direction, and the turn broaching working is carried out by the turn broaching working tip while rotating the broaching tool and moving the turn broaching working chip in the tangential direction of the work, so that the turning working and the turn broaching working can be performed by one machining center. Thus, the machining center can be made compact, can be widely and generally utilized. Furthermore, it is possible to mount a number of tips to the broaching tool, so that the tool exchanging frequency due to the tip wearing or tip damage will be reduced, and hence, the working performance of the machining center can be improved, resulting in the improved productivity.

Furthermore, the machining center may further comprises a work conveying means for conveying the works to the respective work stations.

According to this embodiment, the work which has been machined at the first work station can be promptly conveyed to the second work station without reversing the work in conveying the work, so that the work conveying means comprises no work reversing means and thus can be made compact and the working line can be prepared with reduced installation cost.

The nature and further characteristic features of the present invention will be made more clear from the following descriptions made with reference to the accompanying drawings.

DESCRIPTION OF THE PREFERRED EMBODIMENTS

Figure 1:
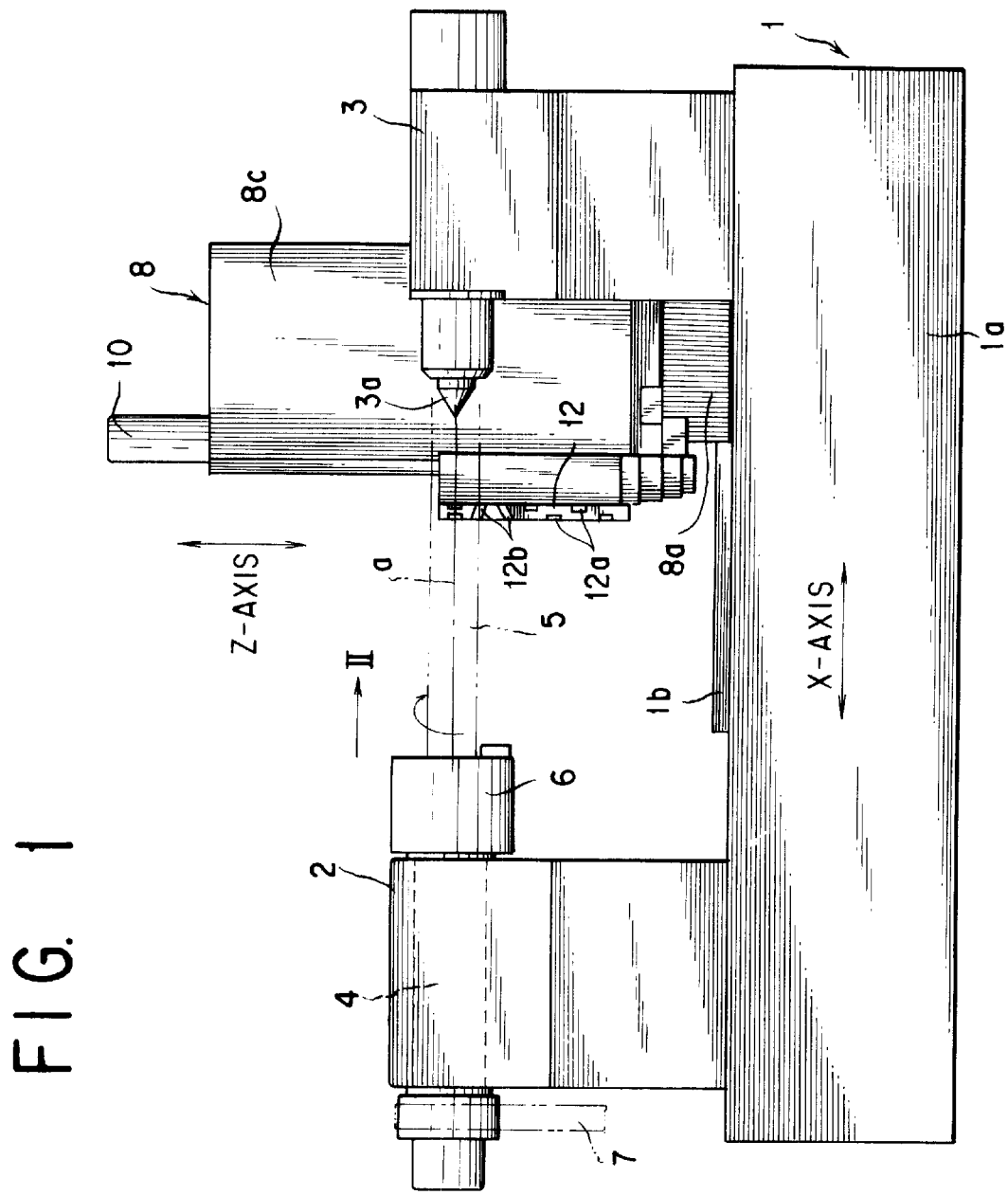
FIG. 1 is a schematic front view of a compound machining center according to a first embodiment of the present invention.

The compound machining center and compound machining method according to preferred embodiments of the present invention will be described hereunder with reference to the accompanying drawings.

With reference to FIGS. 1 to 4, a compound machining center 1 is provided with a long bed 1a extending in an X-axis direction (horizontal direction in FIG. 1), and a work driving unit 2 and a tail stock center 3 are mounted on the bed 1 with space from each other in the X-axis direction and to be movable in this direction.

A main spindle 4 is mounted to the work driving unit 2 so as to extend in parallel to the X-axis direction and to be rotatable, and a chuck 6 for grasping one end of a work (workpiece) 5 is mounted to an end portion of the main spindle 4 on the side of the tail stock center 3. The main spindle 4 is driven to be rotatable by a main spindle driving source, not shown, which is connected to the other one end portion of the main spindle 4 through a power transmission means 7.

A center member 3a is provided for the tail stock center 3 on the same axial line as the main spindle 4 of the work driving unit 2. When the center member 3a is inserted into a center hole, not shown, formed on the other end of the work 5, the work 5 can be supported on a working axis line between the chuck 6 and the work 5.

Further, reference numeral 8 denotes a working unit which is movable in the X-axis direction through a guidance of a guide rail 1b arranged on the bed 1a in parallel to the X-axis direction, and the working unit 8 is provided with a sliding base 8a movable in the X-axis direction by a X-axis driving means, not shown. A plurality of guide rails 8b are laid on the sliding base 8a in a Y-axis direction (i.e. direction perpendicular to the X-axis direction and perpendicular to a drawing paper surface in FIG. 1) and a column 8c is supported on the guide rails 8b so as to be movable in the Y-axis direction by a Y-axis driving means, not shown.

Figure 2:
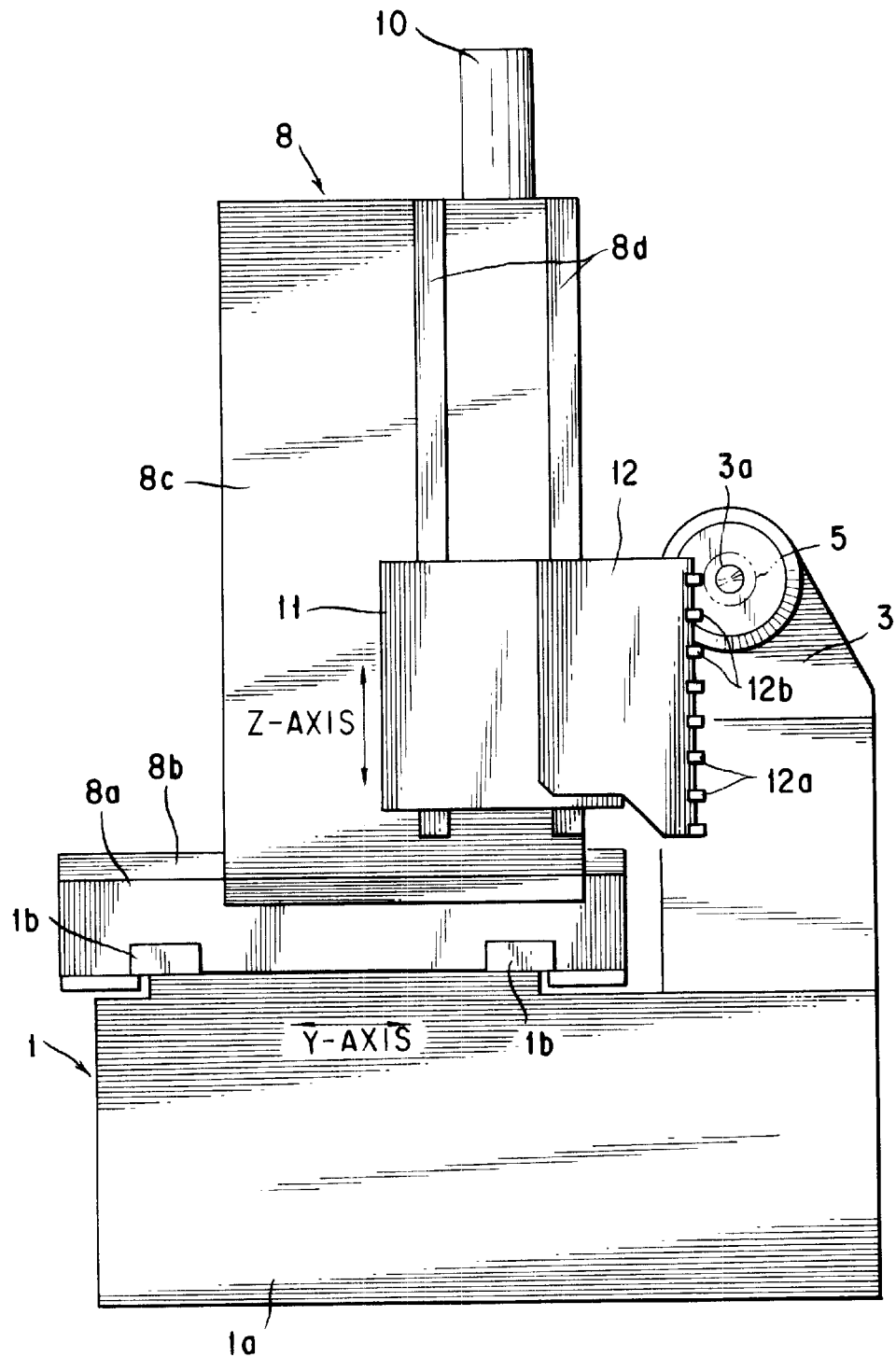
FIG. 2 is a view viewed in a direction of an arrow II in FIG. 1.

As best shown in FIG. 2, a plurality of guide rails 8d are mounted on the column 8c so as to extend in a Z-axis direction (i.e. vertical direction in FIG. 1), and a tool rest (post) 11, which is vertically movable by Z-axis driving means 10 disposed on the column 8c, is supported by these guide rails 8d. A tool 12 for carrying out a turning working to the work 5 is detachably mounted to the tool rest 11.

Further, as can be understood from the above description, it is to be noted that the X-axis, Y-axis and Z-axis mentioned herein are three dimensional axes which are normal to each other.

Figure 3:
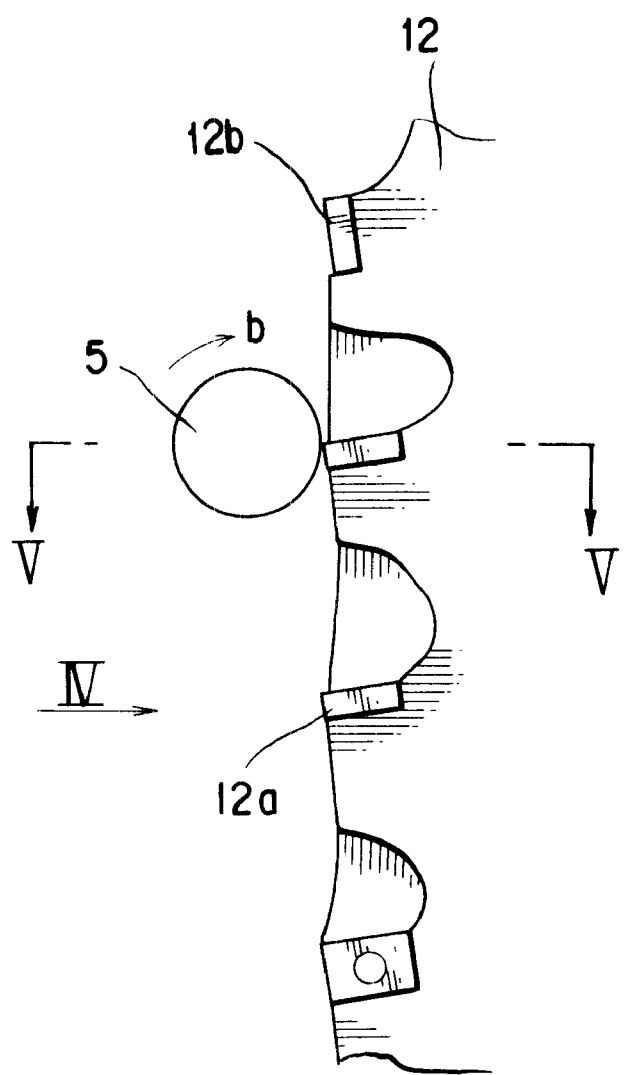
FIG. 3 is a side view, in an enlarged scale, of a tool used for the compound machining center of the first embodiment of FIG. 1.
Figure 4:
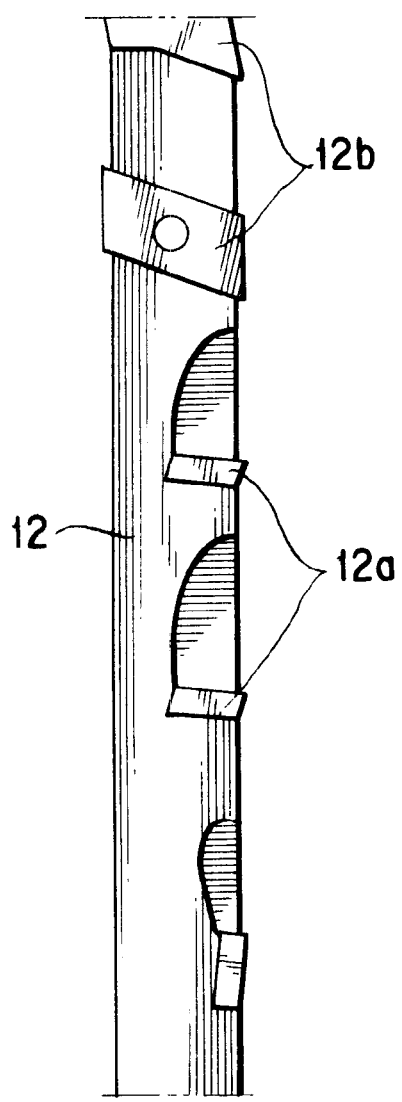
FIG. 4 is a view viewed in a direction of an arrow IV in FIG. 3.
Figure 5:
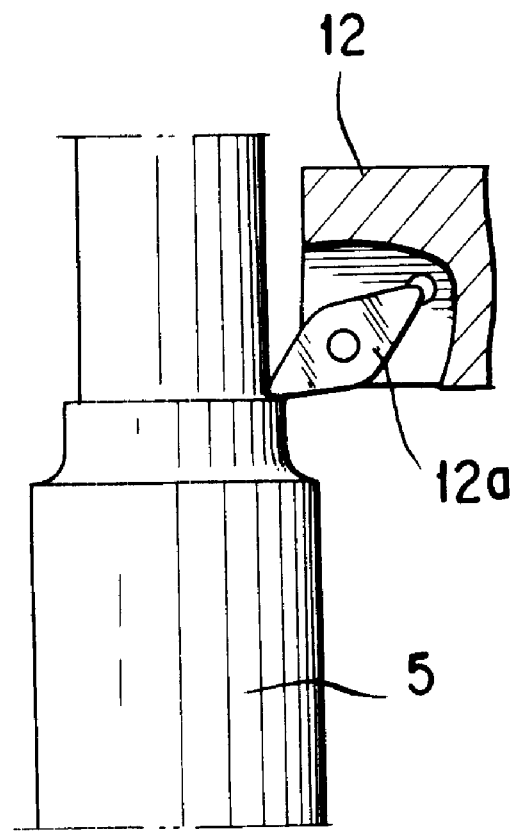
FIG. 5 is a sectional view taken along the line V—V in FIG. 3.

The tool 12 has a structure capable of performing a compound working or machining of both the turn broaching working and the turning working and, on the surface of the tool 12 facing the work 5 to be worked, a plurality of turn working tips 12a and at least one broaching working tip 12b for carrying out roughing working and finishing working to the work 5 are mounted, to be detachable, linearly vertically with space from each other as viewed in FIGS. 3 to 5.

Then there will be described hereunder a compound machining method of carrying out the turning working and the turn broaching working to a shaft-shaped work 5 such as crankshaft by using the compound machining center of the structure mentioned above.

In the turning working, the tool 12 is moved in the X- or Y-axis direction, or in both the X- and Y-axis directions while rotating the work 5 to thereby carry out the turning working to the work 5 by the turning working tips 12a of the tool 12. The turning working is generally utilized for roughing working to the work.

On the other hand, in the turn broaching working, the tool 12 is moved in the tangential direction of the work 5 while rotating the same to thereby carry out the turn broaching working to the work 5 by at least one broaching working tip 12b. The turn broaching working is generally utilized for finishing working to the work.

In this meaning, according to the preferred embodiment of the present invention, after the work has been roughly worked through the turning working, the work is continuously finely worked (finished) through the turn broaching working by the turning working tips 12a and the turn broaching working tip 12b which are mounted or formed integrally to a tool body of the tool 12.

The turning working and the turn broaching working may be of course carried out independently. In the turning working to the work 5, the work 5 is conveyed to a portion between the chuck 2 of the work driving unit 2 and the center member 3a of the tail stock center 3 by a work conveying mechanism, not shown. In this state, the one end of the work 5 having the shaft-shaped structure is grasped and the center member 3a of the tail stock center 3 is inserted into the center hole formed on the other end of the work 5 to thereby support the work on the working axial line a as shown in FIG. 1

In the next step, the column 8c of the working unit 8 is moved to the waiting position before working the work 5 by at least one of X-axis driving means and Y-axis driving means while rotating the work 5 in a direction of the arrow b as shown in FIG. 3 by the work driving unit 2.

In the next step, the tool 12, which is now stopped and held to the waiting position, is lowered by the Z-axis driving means 10. Then, the turning working tips 12a mounted to the tool 12 are positioned to the working positions, and simultaneously, the working unit 8 is moved in the X- or Y-axis direction or both these directions by the X- and Y-axis driving means to thereby carry out the turning working to the work 5 by the turning working tips 12a, thus performing the roughing working to the work 5.

After the completion of the roughing working to the work 5 in the manner mentioned above, the work finishing working will be performed subsequently through the turn broaching working. The turn broaching working is carried out in the manner such that the tool 12 is moved in at least one of the X-axis direction and the Y-axis direction to the predetermined broaching working position, and thereafter, the tool 12 is moved linearly in the tangential direction of the work 5 by the Z-axis driving means 10 while rotating the work 5 and the work 5 is then subjected to the turn broaching working by at least one broaching working tip 12b mounted to the tool 12.

The turning working and the turn broaching working are continuously carried out to all the portions of the work 5 to be worked by repeating the steps mentioned above. Further, during these working steps, a groove forming working may be carried out by preliminarily providing a groove forming tip to the tool 12.

Figure 6:
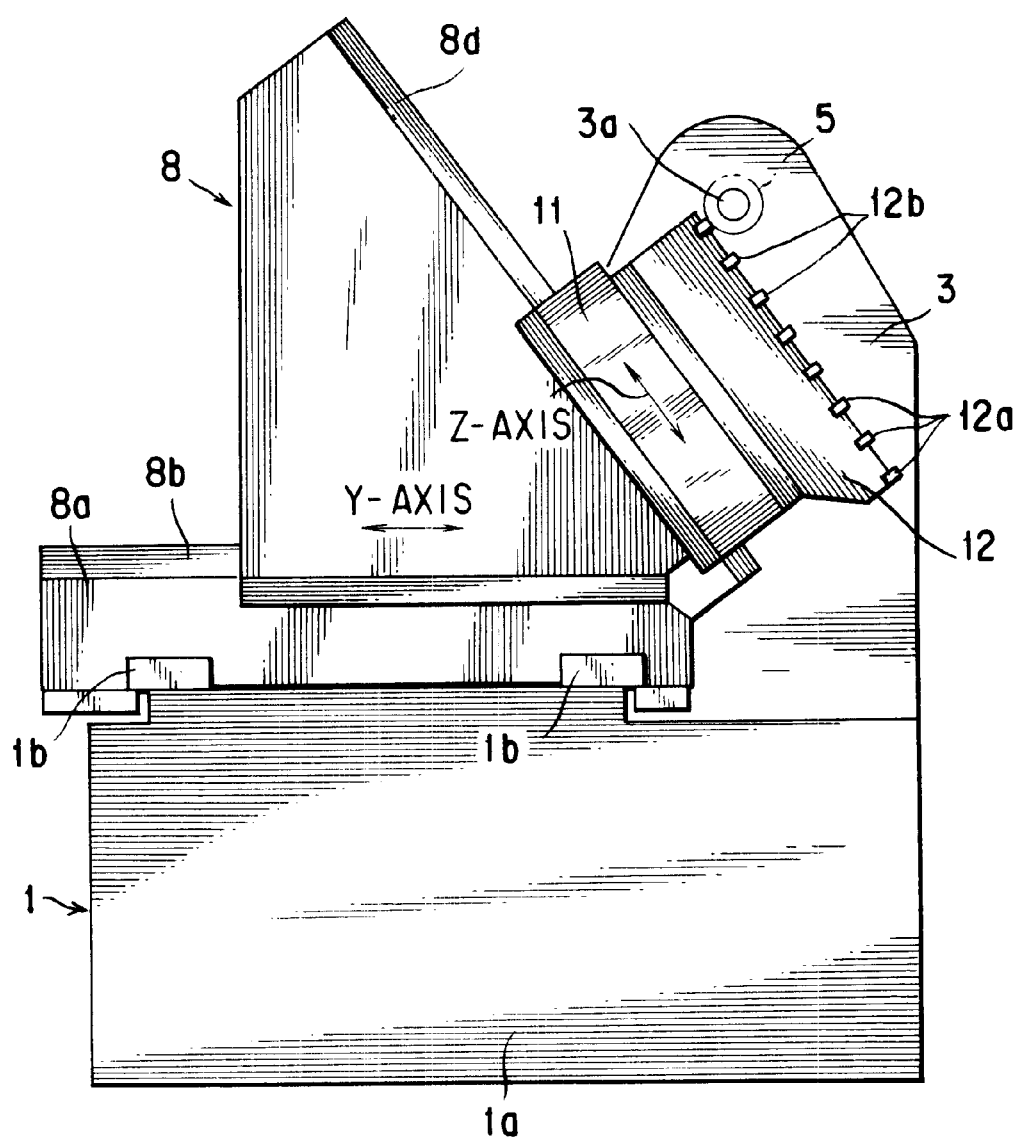
FIG. 6 is a side view of a compound machining center of a modified embodiment of the present invention.

FIG. 6 represents a modified embodiment of the compound machining center according to the present invention.

In this modified embodiment, a surface of the column 8c on the side of the work 5 (i.e. work side surface of the column 8c) is formed as a forward inclining surface, on which guide rails 8d are mounted, and the tool rest 11 is supported by the guide rails 8d. According to this embodiment, as like in the former embodiment, the tool 12 mounted to the tool rest 11 is moved vertically along the inclining surface of the column 8c by the Z-axis driving means 10.

In this modified embodiment, since it is required for the tool 12 to be moved in the radial direction of the work 5 at the time of the turning working, an interpolation process is required in the case of working the end face of the work 5, but in other cases, both the turning working and turn broaching working are performed in substantially the same manner as that mentioned in the former embodiment, and the explanation thereof is omitted herein.

Figure 7:
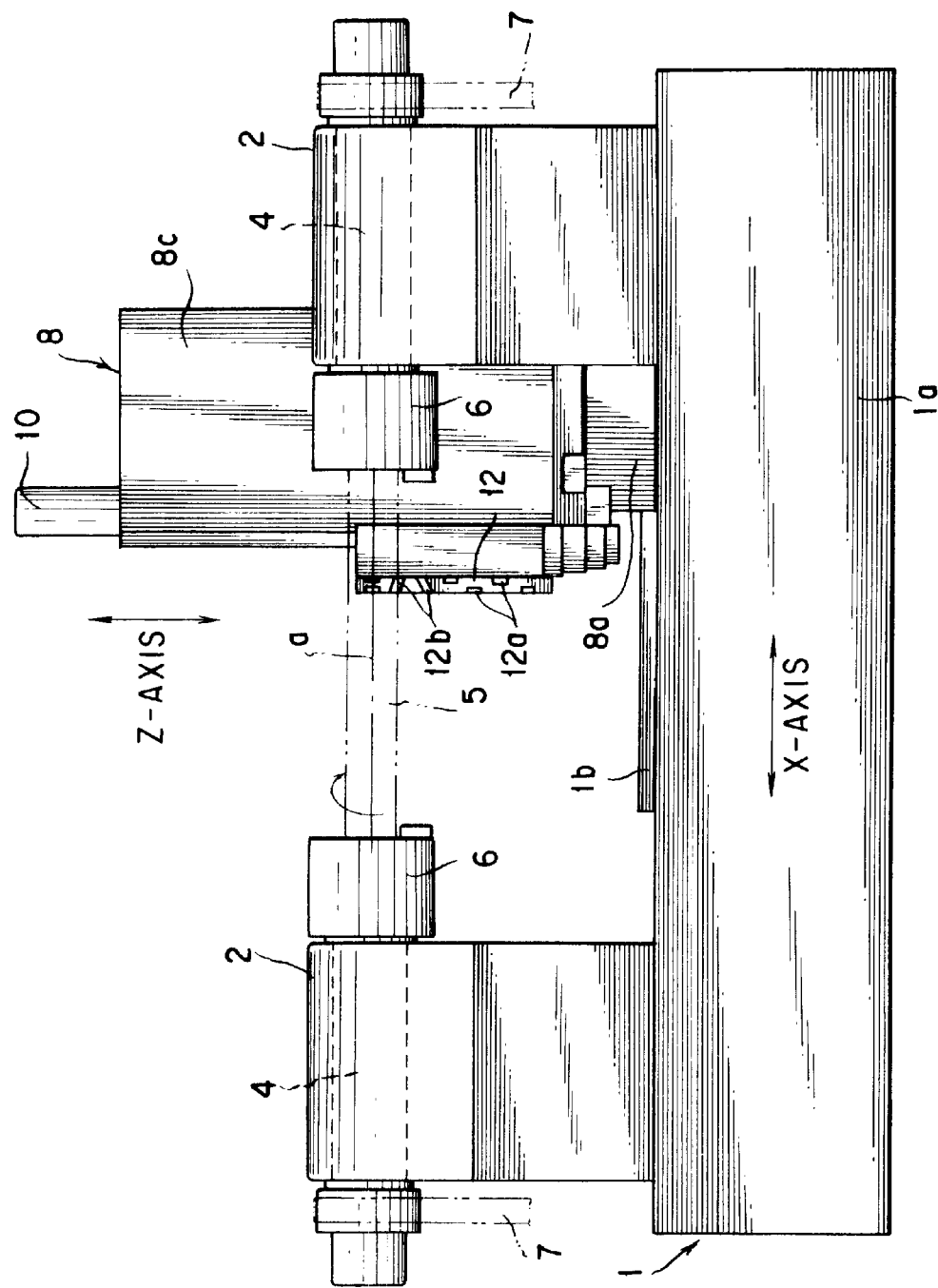
FIG. 7 is a front view of the modified embodiment of the machining center.

Further, in the embodiments mentioned above, the one end of the work is grasped by the chuck 6 of the work driving unit 2 and the other end thereof is supported by the tail stock center 3, and under this condition, the work 5 is rotated by the work driving unit 2. In an alternation, however, as shown in FIG. 7, a pair of work driving units 2 may be arranged on the bed 1a with chucks 6 thereof being opposed to each other so as to grasp both the end portions of the work 5 and to rotate the work 5 under this condition.

Still furthermore, though not shown, the work 5 may be rotated by means of lathe dog provided to the work driving unit 2 with both the ends of the work 5 being supported by the tail stock center 3.

Figure 8:
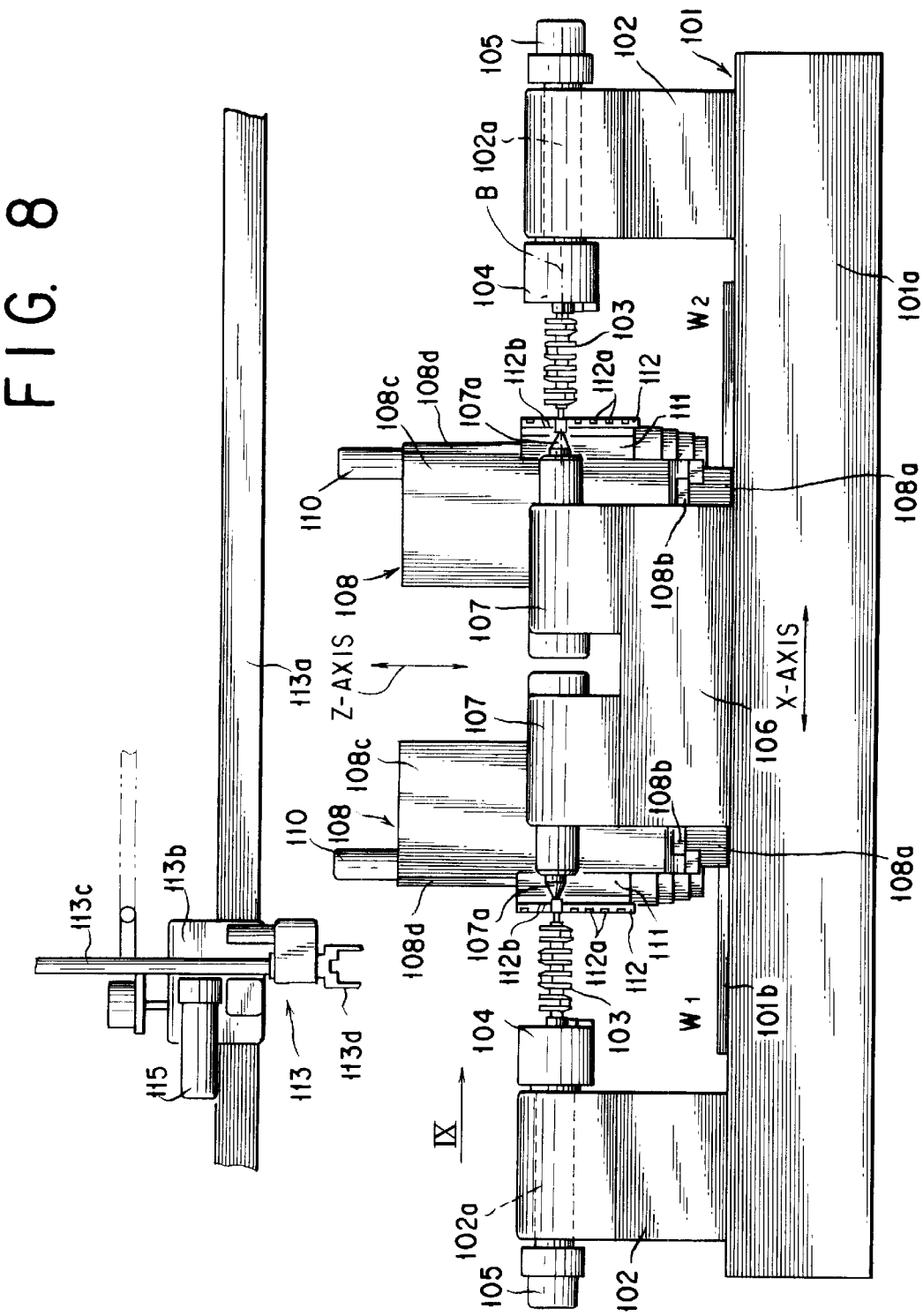
FIG. 8 is a schematic front view of a compound machining center according to a second embodiment of the present invention.
Figure 9:
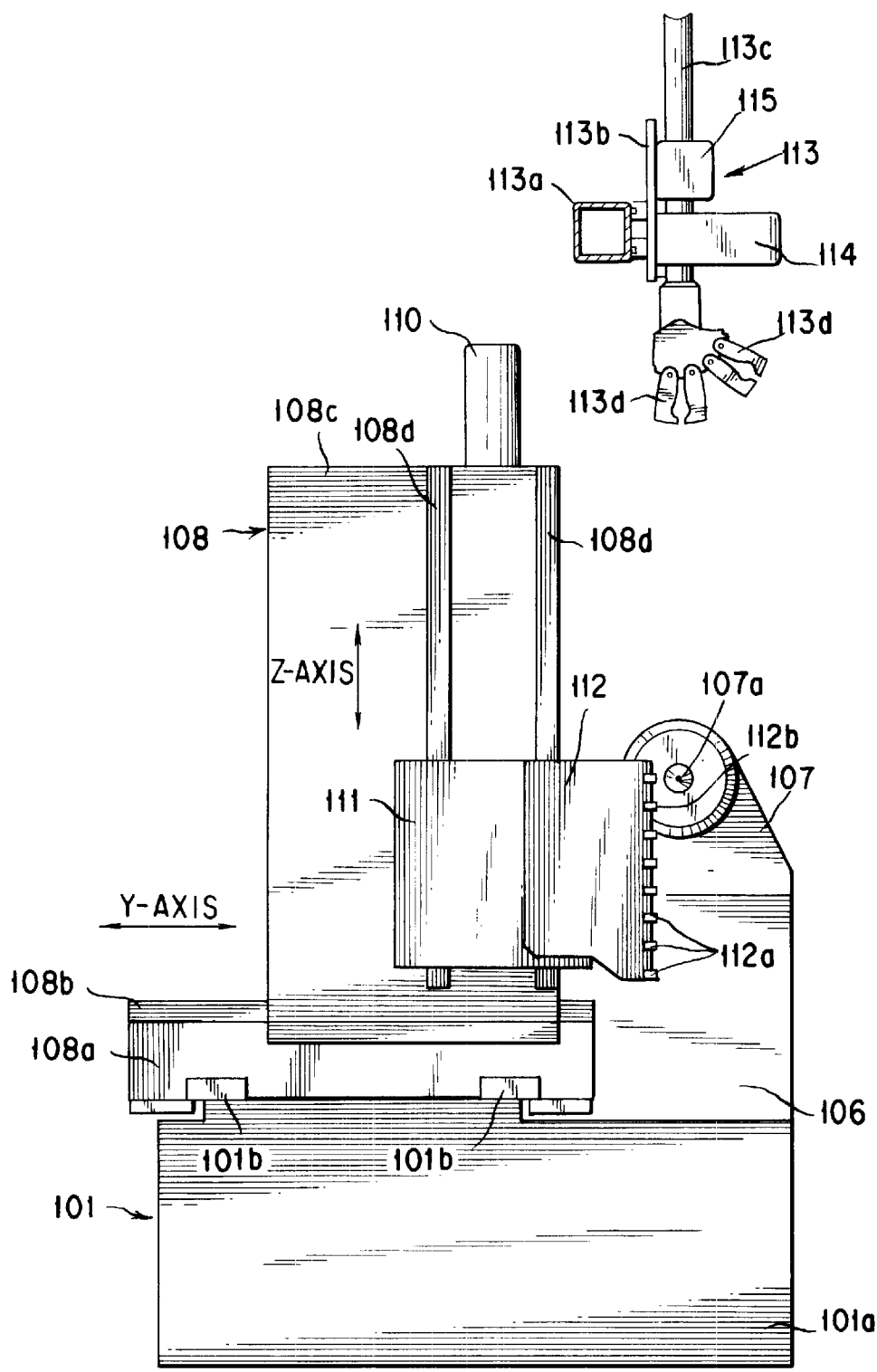
FIG. 9 is a view viewed in a direction of an arrow IX in FIG. 8.

FIG. 8 shows a front view of the compound machining center according to the second embodiment of the present invention and FIG. 9 is a view viewed in the direction of an arrow IX—IX in FIG. 8.

With reference to FIGS. 8 and 9, a compound machining center 101 is provided with a common bed 101a of a long scale structure, and a pair of work driving units 102 are mounted on both end side portions of the common bed 101a to be movable in the longitudinal direction thereof.

Main spindles 102a, 102a are supported by the work driving units 102, 102, respectively, on the same central line (working axial line B) to be rotatable in an opposed manner, and chucks 104, 104 are mounted to the opposed end portions thereof to grasp both ends of the work 103. The other end portions (i.e. outer side end portions) of the main spindles 102a, 102a are connected to main spindle driving means, not shown, through power transmission mechanisms 105, 105, respectively, to rotate the main spindles.

A base 106 is mounted on an approximately central portion of the common bed 101a and two tail stock centers 107, 107 are mounted on the base 106 in a manner that center members 107a, 107a of the respective tail stock centers 107, 107 are directed to the chucks 104, 104 of the two work driving units 102, 102.

The tail stock centers 107 act to support both the ends of the work 103 by inserting the center members 107a into center holes, not shown, formed on the ends of the work 103 so as to support the other ends of the work 103 having the one end which is grasped by the chuck 104 on the working axis line B.

In FIGS. 8 and 9, reference numeral 108 denotes two working units which are movable in the direction of the working axial line B through the guidance of guide rails 101b aid on the common bed 101a. The working units 108 are provided with slide bases 108a which are movable in the X-axis direction parallel to the working axis line B by two driving means, not shown, which independently drive the slide bases. A plurality of guide rails 108b are laid on the slide bases 108a so as to extend in the Y-axis direction which is perpendicular to the X-axis direction, and columns 108c are supported on the guide rails 108b to be movable in the Y-axis direction.

A plurality of guide rails 108d are laid on the columns 108c so as to extend vertically (i.e. in the Z-axis direction), and tool rests 111 are supported by the guide rails 108d to be vertically movable by the Z-axis driving means mounted on the columns 108c, respectively.

Tools 112 for carrying out the turning working to the work 103 are detachably mounted to the tool rests 111.

Figure 11:
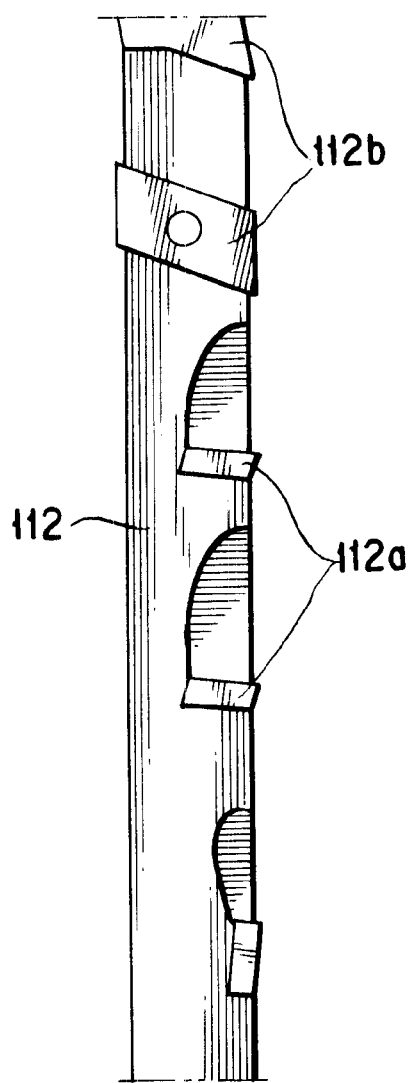
FIG. 11 is a front view, in an enlarged scale, of a tool used for the compound machining center of the second embodiment and the third embodiment.

A plurality of tips 112a for the turning working and a plurality of tips 112b for the turn broaching working are detachably mounted to a surface of the tool body of the tool 112 facing the work 103 to be worked along the vertical direction, as viewed in FIG. 11, with space from each other.

The tool 112 has a structure suitable for carrying out the turning working to the work 103 in which the work 103 is subjected to the turning working, while being rotated, by moving the turning working tips 112a in the X- or Y-axis direction or in both these directions simultaneously and for carrying out the turn broaching working to the work 103 in which the work 103 is subjected to the turn broaching working, while being rotated, by moving the turn broaching tips 112b in the tangential direction of the work 103

In FIGS. 8 and 9, reference numeral 113 denotes a work conveying means (mechanism) such as autoloader for conveying the work 103 in he compound machining center 101 from the upper side thereof or conveying out the work therefrom. The work conveying means 113 has a horizontal bar or rod 113a disposed above the compound machining center 101 so as to extend in the horizontal direction parallel to the X-axis direction, and a traveling body 113b is mounted to the horizontal bar 113a to be movable in the X-axis direction by a travel drive means 114.

A lift rod 113c is mounted to the traveling body 113b to be vertically movable by a lift drive source 115, and a clamping member 113d for clamping the work 103 is attached to the lower end portion of the lift rod 113c.

The turning working and turn broaching working are effected in the following manner to the work having a shaft-shaped structure such as crankshaft by using the compound machining center of the structure mentioned above.

In the turning working, the tool 112 is moved in the X- or Y-axis direction, or in both the X- and Y-axes directions while rotating the work 103 to thereby carry out the turning working to the work 103 by the turning working tips 112a of the tools 112. In this working, since a large amount of turning (cutting) is ensured, this turning working is generally utilized for roughing working to the work.

On the other hand, in the turn broaching working, the tool 112 is moved in the tangential direction of the work 103 while rotating the same to thereby carry out the turn broaching working sequentially to the work 103 by the broaching working tips 112b. The turn broaching working is generally utilized for finishing working to the work.

In this meaning, according to this preferred embodiment of the present invention, after the work has been roughly worked through the turning working, the work is continuously finely worked (finished) through the turn broaching working.

The turning working and the turn broaching working may be of course carried out independently.

In the turning working to the work 103, the work 103 is conveyed to a first work station W1 positioned upstream side for the working, with the work 103 being clamped by the clamping member 113d of the work conveying means 113, and then, one end of the work 103 is grasped by the chuck 104 and the other end thereof is supported by the center member 107a of the tail stock center 107.

In the next step, when the work 103 is rotated by the main spindle driving means, the tool rests 111 which have been held to a waiting position, is moved in the Z-axis direction by the Z-axis driving means 110. Then, the turning working tips 112a mounted to the tool 112 are positioned to the working positions, and simultaneously, the working units 108 are moved in the X- or Y-axis direction or both these directions by the X-axis and Y-axis driving means to thereby carry out the turning working to the work 103 by the turning working tips 112a, thus performing the roughing working to the work 103.

According to the manner mentioned above, the work 103 is subjected to the roughing working, but in a case where such roughing working is performed in plural times by changing the turning working tips 112a, the tool 112 is moved in the Z-axis direction by the Z-axis driving means 110 after the first one roughing working, and the next work turning working is performed by the changed turning working tips 112a.

After the completion of the roughing working to the work 103 in the manner mentioned above, the work finishing working will be performed subsequently through the turn broaching working. The turn broaching working is carried out in the manner such that the tool 112 is moved linearly in the tangential direction of the work 103 by the Z-axis driving means 110 while rotating the work 103, which has been roughly worked, and the work 103 is then subjected to the turn broaching working by the turn broaching working tips 112b mounted to the tool 112 by subsequently using roughing working tip, intermediately finishing tip and fining tips of the turn broaching working tips 112b.

Upon the completion of the working to all the portions of the work, except for the one end portion gripped by the chuck 104, by repeatedly carrying out the above workings, the worked work 103 is then conveyed to a second work station W2 disposed downstream side of the first work station W1 by the conveying means 113, and in the second work station W2, the other end portion, which has been worked, of this work 103 is grasped by the chuck 104 of the work driving unit 102 and the one end, which has not been worked, is supported by the center member 107a of the tail stock center 107. Under this state, the turning working and the turn broaching working is performed to the one end, which has not been worked, by the tool 112 mounted to the working unit 108 of the second work station W2.

During this operation, a new work 103 to be worked is conveyed to the first work station W1 by the conveying means 113, in which this work is started to be worked.

By repeating these working operations mentioned above, all the portions including both the end portions of the work 103 can be worked completely by one compound machining center.

According to the described embodiment of the present invention, since the work driving units 102 are mounted on both end sides of the common bed 101a and the tail stock centers 107 are disposed between these work driving units 102, the work 103 which has been worked in the first work station W1 can be conveyed to the second work station W2 without changing the direction of the work 103 to carry out the working to the unworked end portion of the work 103, so that it is not necessary to specifically locate any work direction changing (reversing) mechanism to the work conveying means 113.

Furthermore, the first and second work stations W1 and W2 are provided with the independent work driving units 102, respectively, the turning working can be done to the work such as crankshaft having different end shapes by changing the turning, i.e. cutting, conditions in the first and second work stations W1 and W2, and the work can be simultaneously worked. Still furthermore, since the work driving units 102 and the working units 108 can be independently controlled by a common control means, it is not necessary to locate other control means for the respective units.

Figure 10:
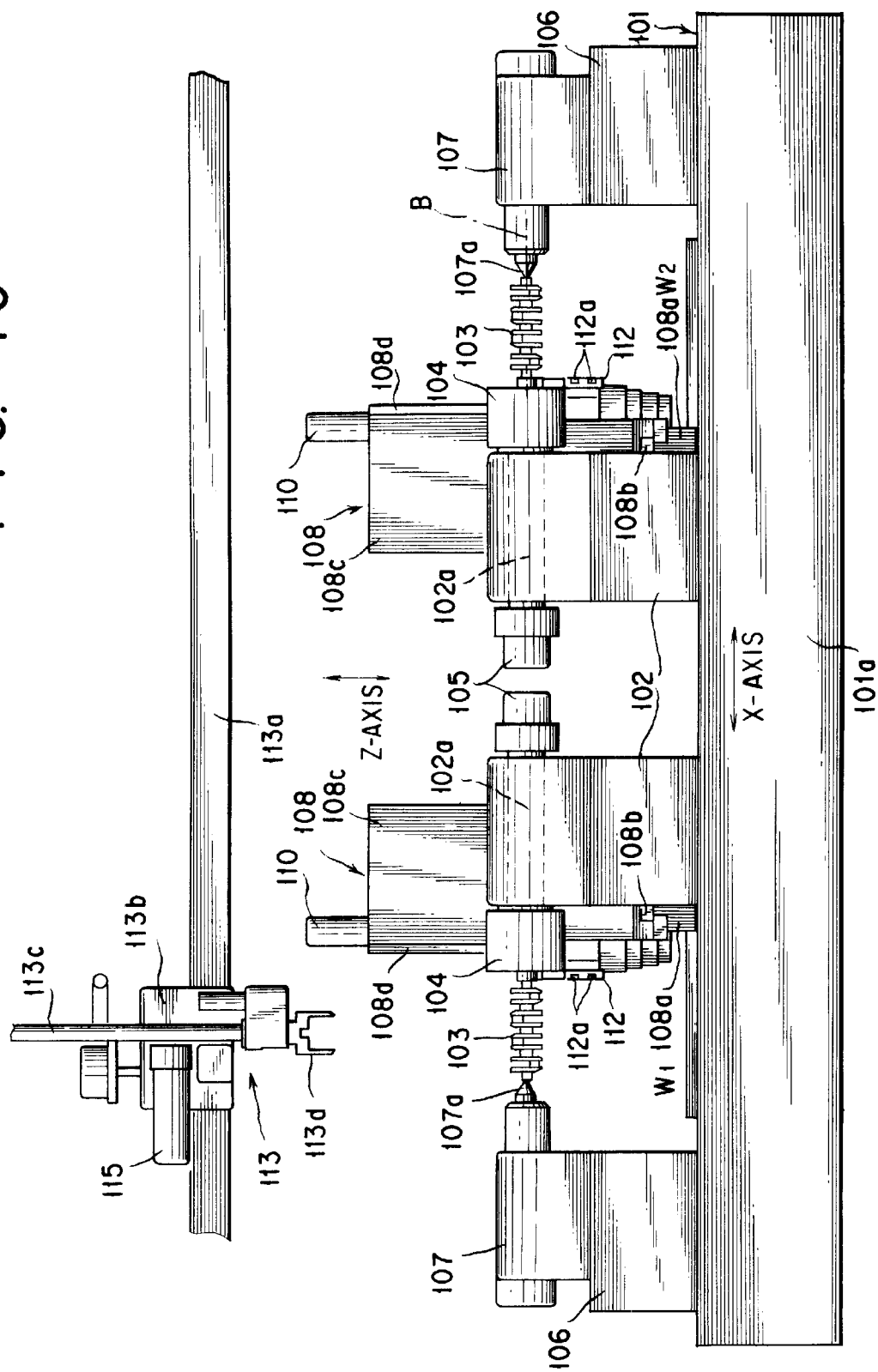
FIG. 10 is a schematic front view of a compound machining center according to a third embodiment of the present invention.

As mentioned above, in the second embodiment, the work driving units 102 are mounted on both end sides of the common bed 110a, and the tail stock centers 107 are disposed between these work driving units 102. On the other hand, as shown in FIG. 10 representing a third embodiment, it may be possible to locate the tail stock centers 107 on both end sides of the common bed 101a and to locate the work driving units 102 between these tail stock centers 107.

Still furthermore, in the described embodiments, all the portions of the work 103 except the one end portion grasped by the chuck 104 is first worked in the first work station W1 and then conveyed to the second work station W2, in which this unworked end portion is then worked in the second work station W2. However, in order to keep a working cycle balance as a whole working process in the working line, it may be possible to first work about the half portion of the work 103 in the first work station W1 and, then, the remaining half portion thereof is worked in the second work station W2. Furthermore, it may be of course possible to first work about the half portion of the work 103 in the second work station W2 and, then, the remaining half portion thereof is worked in the first work station W1.

Still furthermore, in the above described embodiments, although the turning working and the turn broaching working are carried out to the work 103 by moving the broaching tool by the Z-axis driving means linearly in the Z-axis direction, these turning working and turn broaching working may be carried out to the work 103 by linearly moving the broaching tool in an oblique vertical direction.

Still furthermore, there may be adopted an embodiment in which the turning working tip 112a and the turn broaching working tip 112b are mounted to a broaching tool having a circular structure, and such broaching tool is sequentially positioned by rotating the same to thereby perform the turning working to the work by the turning working tip 112a and perform the turn broaching working to the work by the turn broaching tip 112b.

Still furthermore, it may be further possible to provide a turret tool rest, to which a plurality of tools are mounted, to the column 108c and to then carry out the turning working to the work 103 while rotating the turret tool rest to exchange the tool. Further, the turning working and the turn broaching working may be performed to the work 103 in combination of the turret tool rest and the circular broaching tool.

Further, it is self-evident to a person skilled in the art that although the present invention is described hereinbefore with reference to the exemplary embodiments, it is possible to make various changes, deletions and additions to the disclosed embodiment without departing from the subject and scope of the present invention. Accordingly, it is to be understood that the present invention is not limited to the described embodiments and includes scopes or its equivalent scope defined by the elements recited in the appended claims.

What is claimed is:

1. A compound machining center comprising:
   a work driving unit, including a chuck, mounted on a bed and adapted to rotate a work to be worked in a state in which the chuck grasps a first end of the work;
   a tail stock center mounted on the bed and adapted to support a second end of the work so as to support the work on a working axial line between the tail stock center and the chuck of the work driving unit;
   a working unit disposed on the bed to be movable in an X-axis direction parallel to the working axis line and a Y-axis direction normal to the X-axis direction; and
   a single tool mounted to the working unit and having a plurality of tips linearly arranged, said tool being linearly movable in a tangential direction of the work for turn broaching working and being stopped from linearly moving in the tangential direction of the work for turning working, thereby enabling both turn broaching working and turning working to be effected both independently or in combination.

2. A compound machining center according to claim 1, wherein said working unit includes Z-axis driving means for linearly driving said tool in a vertical direction in a state in which the working unit is placed on the bed.

3. A compound machining center according to claim 1, wherein Z-axis driving means is provided for linearly driving said tool in an obliquely vertical direction in a state in which the working unit is placed on the bed.

4. A compound machining center comprising:
   a pair of work driving units, each including a chuck, mounted on a bed and adapted to rotate a work to be worked in a state in which the chucks grasp respective first and second ends of the work so as to support the work on a working axis line;
   a working unit disposed on the bed to be movable in an X-axis direction parallel to the working axis line and a Y-axis direction normal to the X-axis direction; and
   a single tool mounted to the working unit and having a plurality of tips linearly arranged, said tool being linearly movable in a tangential direction of the work for turning broaching working and being stopped from linearly moving the tangential direction of the work for turning working, thereby enabling both turn broaching working and turning working to be effected both independently or in combination.

5. A compound machining center according to claim 4, wherein said working unit comprises Z-axis driving means for linearly moving said tool in a vertical direction in a state in which the working unit is placed on the bed.

6. A compound machining center according to claim 4, wherein said working unit comprises Z-axis driving means for linearly moving said tool in an obliquely vertical direction in a state in which the working unit is placed on the bed.

7. A tool adapted to be mounted to a working unit which is movable in at least one of an X-axis direction and a Y-axis direction normal to the X-axis direction, said tool comprising:
   a tool body;
   a turning working tip mounted to the tool body for carrying out turning working to a work while moving the tool in at least one of the X-axis direction and the Y-axis direction while rotating the work and without linearly moving the tool in a tangential direction of the work; and
   a turn broaching working tip mounted to the tool body for carrying out turn broaching working to the work while rotating the work and linearly moving the tool in the tangential direction of the work,
   wherein a plurality of said tips are linearly arranged to enable both turn broaching working and turning working to be effected in combination using one tool.

8. A tool according to claim 7, wherein said turning working tip and said turn broaching working tip are arranged linearly on the tool body.

9. A compound machining method comprising:
   a step of preparing a tool provided with a plurality of turning working tips and at least one turn broaching working tip, which are arranged linearly to the tool;
   a turning working step in which: (i) the tool is linearly moved in a tangential direction of a work to be worked, to position the turning working tips of the tool to a working position, and (ii) the work is subjected to turning working by the turning working tips while rotating the work and moving the tool in at least one of an X-axis direction and a Y-axis direction normal to the X-axis direction; and
   a turn broaching working step in which: (i) the tool is indexed to a broaching working position in an axial direction of the work, and (ii) the work is then subjected to turn broaching working by the turn broaching working tip of the tool while rotating the work and linearly moving the tool in a tangential direction of the work,
   wherein said turning working step and said turn broaching working step are carried out independently or in combination by positioning said tool in the tangential direction of the work.

10. A compound machining center comprising:
    a pair of work driving units, each including a chuck, mounted to a common bed in a state in which the chucks are opposed to each other, each of the chucks being adapted to respectively grasp a first end of each of works to be worked;

a pair of tail stock centers, each including a center member, disposed between said work driving units in a state in which said center members are opposed to said chucks respectively, each of the center members being adapted to respectively support a second end of each of the works, wherein the tail stock centers and the work driving units together form a first work station and a second work station for supporting both of the works on a same working axis line;

a first working unit for the first work station and a second working unit for the second work station, mounted on the common bed to be movable in an X-axis direction parallel to the working axis line and a Y-axis direction normal to the X-axis direction; and a first tool and a second tool detachably mountable to the first and second working units respectively, each of said tools being linearly movable in a tangential direction of the work for turn broaching working and being stopped from linearly moving in the tangential direction of the work for turning working, thereby enabling both turn broaching working and turning working to be effected both independently or in combination.

11. A compound machining center according to claim 10, wherein said tools are mounted to the working units to be movable linearly in a vertical, Z-axis direction, and each of said tools comprises: a tool body; a turning working tip mounted to the tool body for carrying out turning working to one of said works while moving the tool in at least one of the X-axis direction and the Y-axis direction without linearly moving the tool in the Z-axis direction; and a turn broaching working tip mounted to the tool body for carrying out turn broaching working to the one of the works while linearly moving the tool in the Z-axis direction.

12. A compound machining center according to claim 10, wherein said tools are mounted to the working units to be movable linearly in an obliquely vertical direction comprises: a tool body; a turning working tip mounted to the tool body for carrying out turning working to one of said works while moving the tool in at least one of the X-axis direction and the Y-axis direction without linearly moving the tool in the obliquely vertical direction; and a turn broaching working tip mounted to the tool body for carrying out turn broaching working to the one of the works while linearly moving the tool in the obliquely vertical direction.

13. A compound machining center according to claim 10, further comprising a work conveying means for conveying the works to the first and second work stations, respectively.

14. A compound machining center comprising:

a pair of tail stock centers, each including a center member, mounted to a common bed in a state in which the center members are opposed to each other, each of the center members being adapted to respectively support a first end of each of works to be worked;

a pair of work driving units, each including a chuck, disposed between said tail stock centers in a state in which said chucks are opposed to said center members respectively, each of the chucks being adapted to respectively grasp a second end of each of the works, wherein the work driving units and the tail stock centers together form a first work station and a second work station for rotating both of the works on a same working axis line;

a first working unit for the first work station and a second working unit for the second work station, mounted on the common bed to be movable in an X-axis direction parallel to the working axis line and a Y-axis direction normal to the X-axis direction; and a first tool and a second tool detachably mountable to the first and second working units respectively, each of said tools being linearly movable in a tangential direction of the work for turn broaching working and being stopped from linearly moving in the tangential direction of the work for turning working, thereby enabling both turn broaching working and turning working to be effected both independently or in combination.

15. A compound machining center according to claim 14, wherein said tools are mounted to the working units to be movable linearly in a vertical, Z-axis direction, and each of said tools comprises: a tool body; a turning working tip mounted to the tool body for carrying out turning working to one of said works while moving the tool in at least one of the X-axis direction and the Y-axis direction without linearly moving the tool in the Z-axis direction; and a turn broaching working tip mounted to the tool body for carrying out turn broaching working to the one of the works while linearly moving the tool in the Z-axis direction.

16. A compound machining center according to claim 14, wherein said tools are mounted to the working units to be movable linearly in an obliquely vertical direction comprises: a tool body; a turning working tip mounted to the tool body for carrying out turning working to one of said works while moving the tool in at least one of the X-axis direction and the Y-axis direction without linearly moving the tool in the obliquely vertical direction; and a turn broaching working tip mounted to the tool body for carrying out turn broaching working to the one of the works while linearly moving the tool in the obliquely vertical direction.

17. A compound machining center according to claim 14, further comprising a work conveying means for conveying the works to the first and second work stations, respectively.

* * * * *